Feb. 25, 1964  A. E. CLAUSON  3,122,485
SERVICING MECHANISM FOR GAS-COOLED NUCLEAR REACTORS
Filed Dec. 6, 1960  4 Sheets-Sheet 2
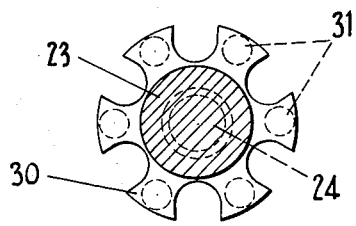
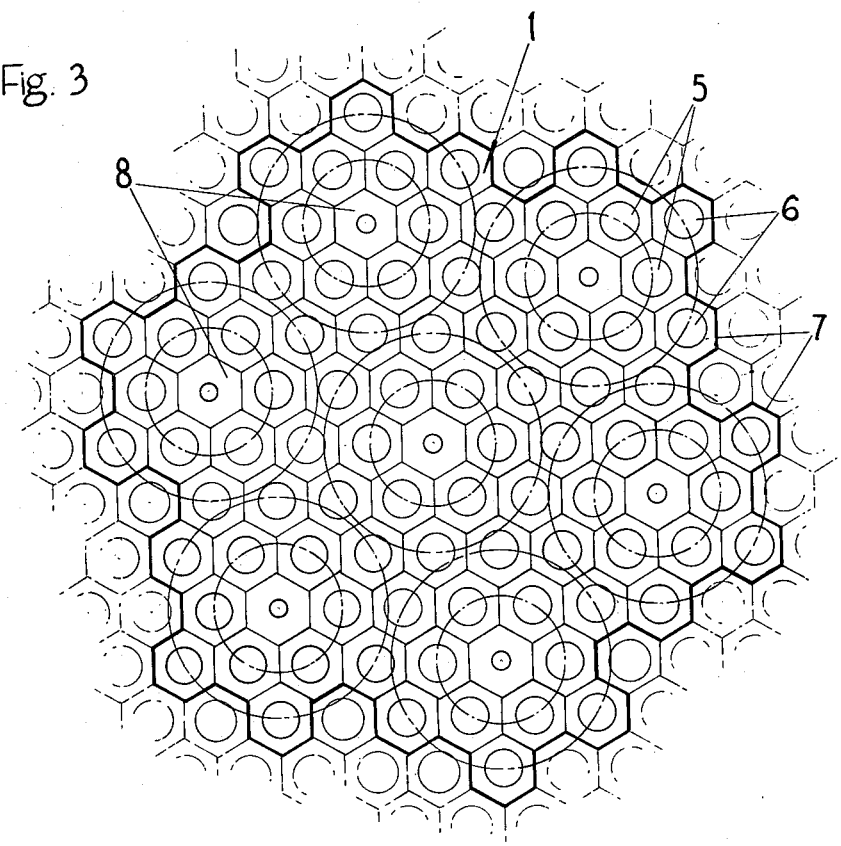
INVENTOR
ALFRED EDWARD CLAUSON
BY
ATTORNEYS United States Patent Office 3,122,485
Patented Feb. 25, 1964

3,122,485
SERVICING MECHANISM FOR GAS-COOLED
NUCLEAR REACTORS
Alfred Edward Clauson, East Ham, London, England,
assignor to The General Electric Company Limited,
London, England
Filed Dec. 6, 1960, Ser. No. 74,198
Claims priority, application Great Britain Dec. 8, 1959
6 Claims. (Cl. 176—30)

The present invention relates to servicing mechanisms for gas-cooled nuclear reactors of the kind having a core formed with channels for the reception of fuel elements, the core being mounted within a pressure vessel providing points of access to the core, for servicing of the reactor, and the channels being arranged in unit areas of symmetry about regions that are clear of fuel element channels. Nuclear reactors of this kind are described in British Patent No. 878,506, filed January 22, 1959.

In the above-mentioned patent specification a servicing or fuel handling mechanism is also described, the mechanism including a rotatable charge tube adapted to be inserted into the pressure vessel and having a retractable radial end portion adapted to engage the ends of the channels in sequence when the charge tube is rotated. Because of the arrangement of the channels in unit areas of symmetry only a relatively small number of standpipes providing access to the core is needed, and as stated in said specification, this number could be reduced even further by arranging for the radial end portion to have a number of different radial operating positions.

One object of the present invention is to provide a simple mechanism enabling the end portion of the charge tube to have a number of different radial operating positions.

According to the present invention, servicing mechanism for a gas-cooled nuclear reactor of the kind specified, includes a rotatable charge tube having an articulated radial end portion adapted to engage the ends of the channels, a cam mechanism defining a plurality of radial positions for the radial end portion, and an indexing member carried by the cam mechanism and rotatable with the charge tube, the indexing member being adapted to cooperate with sensing means within the pressure vessel whereby to operate the cam mechanism in accordance with the azimuthal position of the radial end portion with respect to the channels in the core.

The cam mechanism may comprise an axially movable cam operating member engaging a follower member on the radial end portion, the axial position of the cam operating member being dependent upon the azimuthal position of the indexing member with respect to the sensing means.

Thus, if the radial end portion is to have two radial operating positions, the indexing member may comprise a rotatable gate having a number of alternate open and closed positions depending upon the number and positions of the channels.

The cam operating member may be a cam plate having a stepped cam surface, the follower member being adapted to engage said surface. Alternatively, the follower member may be a cam plate having a stepped cam surface, the cam operating member being adapted to engage this surface.

In order that the invention may be readily understood, several embodiments of the invention will now be described, by way of example, with reference to the accompanying drawings, in which:

FIGURE 2 is a sectional plan on line II—II in FIGURE 1;

FIGURE 3 is a fragmentary plan view of the reactor core, the figure illustrating the core structure;

Figure 1:
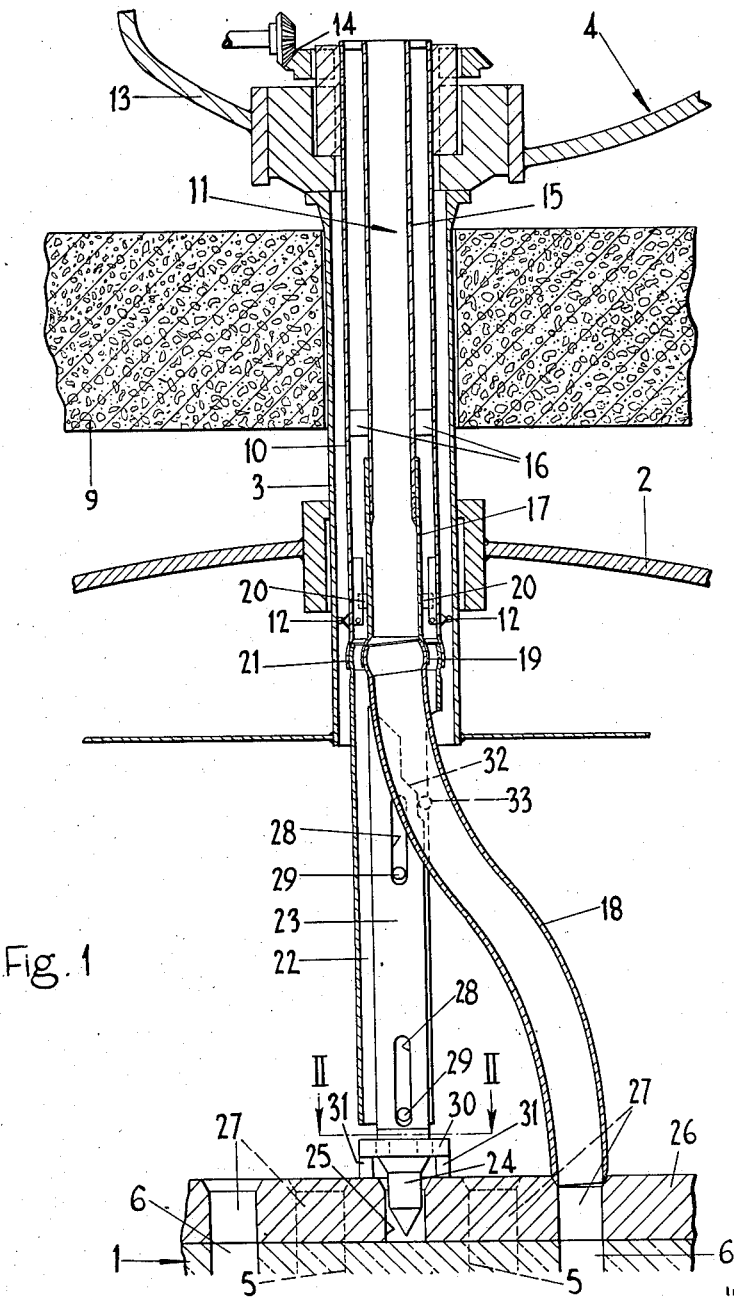
FIGURE 1 is a fragmentary sectional elevation showing a servicing mechanism in operation.

Referring to FIGURES 1, 2 and 3 of the drawings, the reactor core 1 of a gas-cooled nuclear reactor is mounted in a pressure vessel 2 providing by way of standpipes, such as 3, passing through a biological shield 9, points of access to the core for servicing mechanism from a servicing machine 4 above the reactor. The core is formed with vertical fuel element channels 5 and 6, arranged in the pattern shown in FIGURE 3 in hexagonal blocks 7 of graphite. The channels 5 and 6 are arranged in unit areas of symmetry about regions, such as the blocks 8, which are clear of fuel element channels, the channels 5 being disposed at one radial distance from the centre of such regions and the channels 6 being disposed at another radial distance. For simplicity, only one channel 5 and one channel 6 are shown in FIGURE 1. By virtue of the symmetrical distribution of channels in the manner shown, the number of standpipes required to provide access to, say, eighty-four channels is only seven.

For servicing of the reactor, in fuel charging and discharging operations for example, the servicing machine 4 is contained in a pressure vessel 13 adapted to be connected to the upper end of the standpipe 3 in a gas-tight manner. The servicing mechanism includes a retractable charge chute housing member 10 constituting a housing for a charge tube 11, and this housing member is provided with bearings 12 engaging the inner wall of the standpipe 3 to facilitate its movement. Inside the pressure vessel 13 is an indexing drive 14 whereby the charge chute assembly can be rotated about its axis; the charge tube 11 is keyed to the member 10 and so rotates with it to service each of the channels in sequence in the manner hereinafter described.

The tube 11 comprises an upper portion 15 connected to the housing member 10 by stop members 16 welded between the opposing surfaces of the said portion and chute, a middle portion 17 telescoping with the portion 15, and a radial end portion 18 articulately connected at 19 to the middle portion 17. Keys 20 are provided between the charge chute 10 and the middle portion 17 of the charge tube.

The housing member 10 is jointed at 21, and its lower portion has a vertical slot 22 through which the radial tube portion 18 can be moved. Within the lower portion of the charge chute housing member 10 is an axially movable member 23 having a locating spigot 24 at its lower end adapted to engage in a locating aperture 25 in a guide pan 26 above the reactor core 1; the guide pan is so designed that its locating apertures 25 are aligned with the centres of symmetry of the channels 5 and 6, and provides servicing apertures 27 corresponding in position to these channels. The member 23 has axial slots 28 engaging pins 29, in the charge chute housing member 10.

Near the lower end of the member 23 is an indexing device 30 in the form of a rotary gate, which cooperates with sensing means in the form of pegs 31 on the guide pan 26. It will be apparent that the axial position of the member 23 is determined by the azimuthal position of the device 30, and hence of the radial portion 18 of the charge tube. The upper end of the member 23 has a cam surface 32 providing two stepped portions which engage a follower 33 on the tube 18, whence it will be seen that the tube 18 can have one of two radial positions depending upon which of the portions of the follower 33 engages.

In operation the lower end of the charge tube is adapted to engage the ends of the channels in each symmetrical group in sequence, alternate channel 5 and 6 being at different radial distances from the centre of symmetry, and the radial portion 18 being positioned automatically by the cam mechanism in accordance with the axial position of the axially movable member 23, and hence with the azimuthal position of the indexing device 30. The charge tube 11, of course, constitutes a guide for fuel elements during their charge and discharge, the fuel element actually being handled by hoist means not shown.

Figure 4:
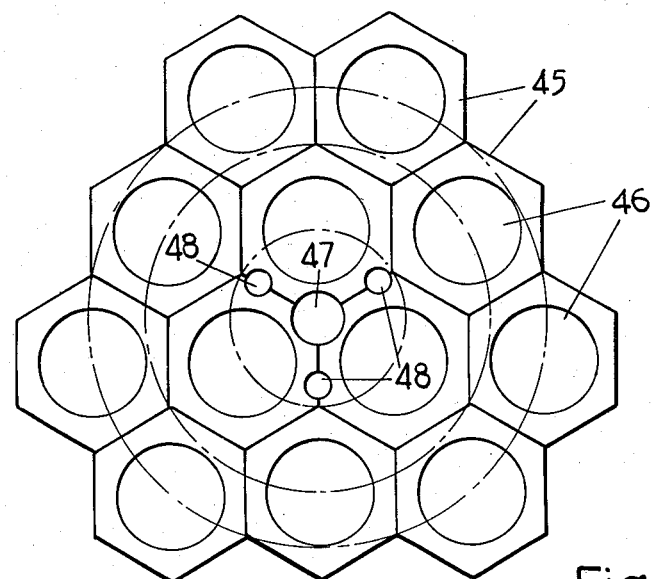
FIGURE 4 is a fragmentary plan view of a reactor core having a modified core structure.
Figure 5:
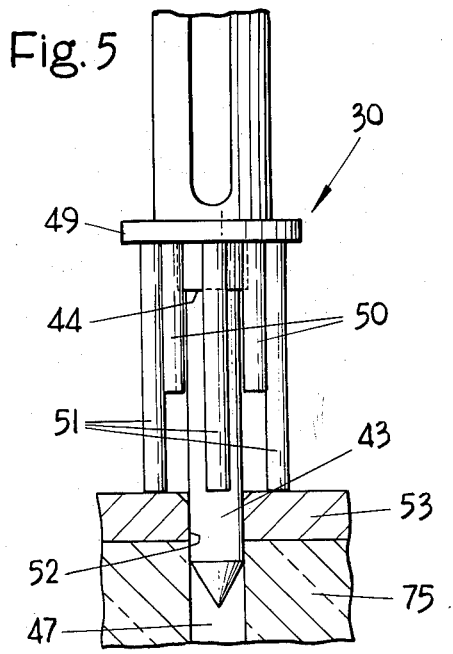
FIGURES 5 and 6 illustrate a detail of a servicing mechanism for use with a reactor having such a modified core structure.
Figure 6:
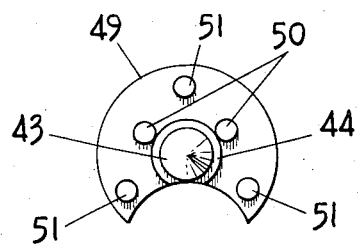

Referring now to FIGURE 4, a modified core structure is shown in which each unit area of symmetry comprises twelve hexagonal blocks 45 having fuel element channels 46, the three innermost blocks being adapted to provide a control rod passage 47 as shown, and clearance holes or locating apertures 48 forming part of the sensing means for the indexing mechanism. The channels 46 are arranged at three radial distances from the passage 47, there being three channels on the inner radius, three on the middle radius, and six on the outer radius. A modified servicing mechanism for use with a reactor having such a core structure is very similar to that described above, but has a modified indexing member illustrated by FIGURES 5 and 6. Referring also to these figures, the indexing member 30 has a locating spigot 43 adapted to engage in a locating aperture 52 in the guide pan 53 the locating aperture 52 being aligned with the control rod passage 47, a rotatable plate 49 of the shape shown in FIGURE 6, and axially extending pegs, or radius pins, 50 and 51, the shorter pegs 50 being herein referred to as the middle radius pegs and longer pegs 51 being referred to as the outer radius pegs.

As in the preceding arrangement, in order to select a particular channel 46, it is necessary to rotate the charge tube to the appropriate azimuthal position and select the appropriate radial setting of the radial end portion of the charge tube. This is achieved by a cam mechanism, as before, the cam mechanism being operated by the indexing member and defining, in this case three radial positions for the radial end portion. When the mechanism is positioned for selection of a channel 46 on the innermost radius, the pegs 50 register with the two other channels on that radius, and the pegs 51 register with the clearance holes 48. The indexing member is thus positioned axially by a shoulder 44. When a channel 46 on the middle radius is to be selected, the pegs 51 are positioned over the three innermost channels and the pegs 50 bear upon the guide pan surface thus determining the second axial position of the indexing member. When a channel 46 on the outer radius is to be selected, the third axial position of the indexing member is determined by the pegs 51 bearing upon the guide pan surface.

Figure 7:
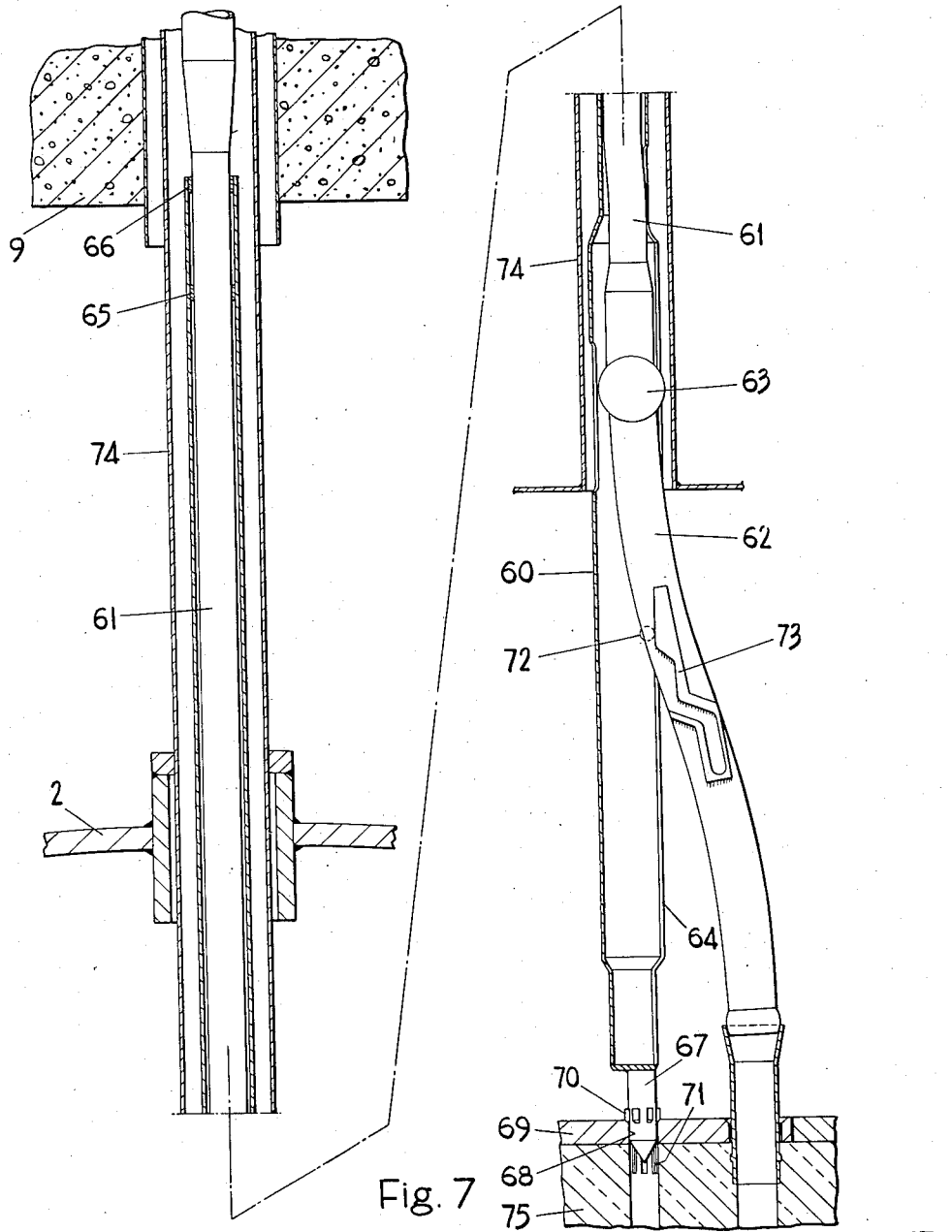
FIGURE 7 is a fragmentary sectional elevation showing a detail of yet another modification of the servicing mechanism.

Referring now to FIGURE 7, a servicing mechanism for use with a reactor having the core structure shown in FIGURE 3, comprises a charge chute housing member 60 housing a charge tube 61, the charge tube having a radial end portion 62 which is articulately connected to the charge tube by a knuckle 63. The charge chute housing member 60 is slotted at 64 to permit radial movement of the portion 62. The housing member 60 is slidable upon the tube 61, but is adapted to be retained at its lowermost position by fillets 65 and 66 on the charge tube and housing member respectively. Attached to the lower end of the member 60 is a locating spigot 67 which is adapted to engage in a locating aperture 68 of the guide pan 69. This locating spigot is formed with radial splines 70 which are adapted to engage in corresponding slots 71 in the aperture 68 and core 75, when the servicing mechanism is appropriately indexed. In order to move the portion 62 radially, a cam mechanism comprises a cam operating member 72 attached to the housing 60, this member being adapted to engage a stepped cam surface of a cam plate 73, constituting a follower member, carried by the portion 62.

In order to select a given channel of the reactor core for charging or discharging, the charge chute assembly is lowered through the appropriate standpipe 74 of the reactor and is indexed to the required azimuthal position. The required radius of the radial end portion 62 is selected in accordance with whether the splines 70 enters the slots 71, in which case the cam operating member 72 reaches its lowest position, or whether the splines 70 are out of register with the slots 71, in which case they bear upon the surface of the guide pan (as shown) and the portion 62 is held in its outer radial position by the cam mechanism.

I claim:

1. In a gas-cooled nuclear reactor having a core formed with channels for the reception of fuel elements, the core being mounted within a pressure vessel providing points of access to the core for servicing of the reactor and the channels being arranged in unit areas of symmetry: a servicing mechanism comprising a charge tube having an axis of rotation, said charge tube having an articulated radial end portion for engaging the ends of said channels, an axially movable indexing member rotatable with said charge tube, fixed sensing means within the pressure vessel for sensing the rotational position of the indexing member and defining a plurality of axial positions therefor, and a cam mechanism actuated by said axially movable indexing member and coupled to said radial end portion for defining a plurality of radial positions for said radial end portion in accordance with the azimuthal position thereof.

2. Servicing mechanism as claimed in claim 1, wherein the cam mechanism comprises an axially movable operating member carrying the indexing member, and a radially movable follower member coupled to the radial end portion, the axial positions of said indexing and operating members being thereby dependent upon the rotational position of said indexing member with respect to the sensing means.

3. Servicing mechanism as claimed in claim 2, wherein the operating member is a cam plate having a stepped cam surface.

4. Servicing mechanism as claimed in claim 2, wherein the follower member is a cam plate having a stepped cam surface.

5. Servicing mechanism as claimed in claim 2, wherein the charge tube comprises a pair of telescopic portions.

6. Servicing mechanism as claimed in claim 1, wherein the cam mechanism defines two radial positions for the radial end portion, and wherein the indexing member comprises a toothed disc providing a number of alternate open and closed positions depending upon the number and positions of the channels.

References Cited in the file of this patent

UNITED STATES PATENTS

| 2,756,858 | Kasschau | July 31, 1956 |
| 2,905,338 | Koch | Sept. 22, 1959 |
| 2,930,744 | Shillitto | Mar. 29, 1960 |
| 2,995,506 | Baldauf | Aug. 8, 1961 |

FOREIGN PATENTS

| 844,765 | Great Britain | Aug. 17, 1960 |

OTHER REFERENCES

Dent: J. Brit. Nucl. Energy Conf., April 1957, pages 146–155. (Copy in Group 220–C.)